(12) United States Patent
Blankenbeckler et al.

(10) Patent No.: US 6,908,725 B2
(45) Date of Patent: Jun. 21, 2005

(54) DOUBLE-SIDED HYBRID OPTICAL DISK WITH SURFACE TOPOLOGY

(75) Inventors: David L. Blankenbeckler, Longmont, CO (US); Brian S. Medower, Boulder, CO (US); Ian R. Redmond, Boulder, CO (US); David H. Davies, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 96 days.

(21) Appl. No.: 10/107,854

(22) Filed: Mar. 25, 2002

(65) Prior Publication Data

US 2002/0136984 A1 Sep. 26, 2002

Related U.S. Application Data

(63) Continuation-in-part of application No. 09/854,333, filed on May 11, 2001, now abandoned, which is a continuation-in-part of application No. 09/764,042, filed on Jan. 16, 2001.

(51) Int. Cl.[7] .............................................. G11B 7/26
(52) U.S. Cl. ................. 430/270.13; 430/945; 428/64.4; 369/275.2; 369/275.5; 369/275.1
(58) Field of Search ................. 430/270.13; 369/275.2, 369/275.3, 275.5, 275.1; 428/64.4

(56) References Cited

U.S. PATENT DOCUMENTS

| 4,450,553 A | 5/1984 | Holster et al. ............... 369/275 |
|---|---|---|
| 4,644,515 A | 2/1987 | Allebest et al. ............... 369/32 |

(Continued)

FOREIGN PATENT DOCUMENTS

| EP | 0549 897 A | 7/1993 | ........... G11B/11/10 |
|---|---|---|---|
| EP | 0780 216 A | 6/1997 | ........... B29D/17/00 |
| EP | 0 969 452 | 12/1997 | ........... G11B/7/00 |
| EP | 0 945 860 | 3/1999 | ........... G11B/7/24 |
| EP | 911820 | * 4/1999 | |
| EP | 0957 477 A | 11/1999 | ........... G11B/7/24 |
| EP | 1 052 632 A | 11/2000 | ........... G11B/7/24 |
| EP | 1126446 | * 8/2001 | |
| JP | 03-086943 | 3/1990 | ........... G11B/7/24 |
| JP | 09-198712 | 1/1996 | ........... G11B/7/24 |
| JP | 10106049 | 9/1996 | ........... G11B/7/26 |
| JP | 2000268417 | 3/1999 | ........... G11B/7/26 |
| JP | 2000285517 | 3/1999 | ........... G11B/7/24 |

OTHER PUBLICATIONS

Database WPI, Section PQ, Week 199939, Derwent Publications Ltd., London GB: AN 1999–464078, XP002204263 and JP 11 195243 A (Sony Corp). (Jul. 21, 1999).

*Primary Examiner*—Martin Angebrannt
(74) *Attorney, Agent, or Firm*—MacPherson Kwok Chen & Heid LLP; Jon W. Hallman

(57) ABSTRACT

An optical disk has a multi-layer tuned optical coating overlying both small bumps to store pre-recorded information and lands onto which information is written to and read. The optical coating includes a phase-change metal/alloy layer formed over the disk substrate and a dielectric layer formed over the phase-change layer. An optical disk according to the invention has specific topological features and sizes.

18 Claims, 4 Drawing Sheets

U.S. PATENT DOCUMENTS

| | | | |
|---|---|---|---|
| 4,774,170 A | | 9/1988 | Pan et al. .................... 430/495 |
| 4,798,785 A | | 1/1989 | Pan et al. .................... 430/495 |
| 4,812,386 A | | 3/1989 | Pan et al. .................... 430/290 |
| 4,860,278 A | | 8/1989 | Nakahara .................... 369/271 |
| 4,960,680 A | | 10/1990 | Pan et al. .................... 430/346 |
| 5,115,424 A | * | 5/1992 | Nakajima et al. ........ 369/275.4 |
| 5,154,957 A | * | 10/1992 | Yamada et al. ............ 428/65.2 |
| 5,271,978 A | | 12/1993 | Vazan et al. .................. 428/64 |
| 5,311,494 A | | 5/1994 | Sugita et al. ................ 369/100 |
| 5,675,568 A | * | 10/1997 | Hajjar et al. ............. 369/47.51 |
| 5,689,497 A | | 11/1997 | Wilting et al. ........... 369/275.1 |
| 5,696,758 A | * | 12/1997 | Yanagimachi et al. ... 369/275.4 |
| 5,703,868 A | | 12/1997 | Kobayashi et al. ......... 369/286 |
| 5,756,265 A | | 5/1998 | Abe et al. .................... 430/321 |
| 5,764,619 A | | 6/1998 | Nishiuchi et al. ........ 369/275.1 |
| 5,933,411 A | * | 8/1999 | Inui et al. ................. 369/275.4 |
| 5,972,459 A | | 10/1999 | Kawakubo et al. ....... 428/64.1 |
| 6,130,871 A | * | 10/2000 | Watabe .................... 369/47.46 |
| 6,154,437 A | * | 11/2000 | Utsunomiya et al. .... 369/275.2 |
| 6,208,736 B1 | | 3/2001 | Gotoh et al. ................ 380/203 |
| 6,210,609 B1 | | 4/2001 | Takeda et al. .............. 264/1.33 |
| 6,221,454 B1 | | 4/2001 | Saito et al. ................. 428/64.1 |
| 6,221,455 B1 | | 4/2001 | Yasuda et al. .............. 428/64.1 |
| 6,228,457 B1 | | 5/2001 | Ueno et al. ................. 428/64.1 |
| 6,269,062 B1 | * | 7/2001 | Minemura et al. ....... 369/47.53 |
| 6,312,547 B1 | | 11/2001 | Fujimori et al. ............ 156/242 |
| 6,382,955 B1 | * | 5/2002 | Sandstrom .................. 425/542 |
| 6,404,708 B1 | * | 6/2002 | Lee .......................... 369/36.01 |
| 6,580,683 B1 | * | 6/2003 | Braitberg et al. ......... 369/275.3 |
| 6,614,745 B1 | * | 9/2003 | Takeda et al. .......... 369/124.13 |
| 6,656,392 B1 | * | 12/2003 | Medower et al. .......... 264/1.33 |
| 2001/0012257 A1 | | 8/2001 | Suzuki et al. ............... 408/64.1 |
| 2001/0033532 A1 | * | 10/2001 | Asano et al. ............. 369/47.22 |
| 2002/0021657 A1 | * | 2/2002 | Lee et al. ................. 369/275.4 |
| 2002/0093901 A1 | * | 7/2002 | Davies et al. .......... 369/109.01 |
| 2002/0094405 A1 | * | 7/2002 | Medower et al. .......... 428/64.4 |
| 2002/0136984 A1 | * | 9/2002 | Blankenbeckler et al. ..................... 430/270.13 |
| 2003/0161254 A1 | * | 8/2003 | Blankenbeckler et al. ....................... 369/275.3 |

FOREIGN PATENT DOCUMENTS

| | | | | |
|---|---|---|---|---|
| JP | 2000 339764 A | | 12/2000 | ............ G11B/7/24 |
| JP | WO 01 16947 | | 3/2001 | ............ G11B/7/004 |
| WO | WO 99/39337 | | 1/1998 | ............ G11B/7/00 |
| WO | WO 99/45539 | | 3/1998 | ............ G11B/19/02 |
| WO | WO 00/72312 | | 5/1999 | ............ G11B/3/70 |
| WO | WO 00/79526 | | 6/1999 | ............ G11B/7/24 |
| WO | WO 01/16947 | | 8/1999 | ............ G11B/7/004 |
| WO | WO 01/18802 | | 9/1999 | ............ G11B/7/24 |
| WO | WO 99 59143 | | 11/1999 | |
| WO | 00/72312 | * | 11/2000 | |
| WO | 00/79526 | * | 12/2000 | |
| WO | 01/75872 | * | 10/2001 | |
| WO | 02/25649 | * | 3/2002 | |

* cited by examiner

Analog Read Signal from ROM Data

DOUBLE-SIDED HYBRID OPTICAL DISK WITH SURFACE TOPOLOGY

CROSS REFERENCE TO RELATED APPLICATIONS

This application is a continuation-in-part of U.S. patent application Ser. No. 09/854,333, filed May 11, 2001, now abandoned, which is a continuation-in-part of U.S. patent application Ser. No. 09/764,042, filed Jan. 16, 2001.

FIELD OF THE INVENTION

The present invention relates to optical storage disks, and in particular, to small size optical storage disks formed with a multi-layer optical coating.

BACKGROUND OF THE INVENTION

Optical data storage media often take form in a data-carrying layer formed on a disk shaped polycarbonate substrate. These devices typically fall in the category of substrate-incident media since data recorded in the data-carrying layer is retrieved by illuminating the data-carrying layer through the substrate. More particularly, illumination light for reading the data first passes through the substrate before being received by the data-carrying layer surface.

Optical data storage media or disks have different properties and can be characterized by their attributes, such as read-only optical data storage media or write-once optical data storage media. In read-only optical data storage media, data is recorded in the data-carrying layer as a series of physical marks or bumps. These physical marks or bumps are typically formed using an injection-molding process. Once formed the physical marks or bumps cannot be erased or overwritten. The physical marks or bumps have different diffractive properties when compared to areas of the read-only data-carrying layer that lack physical marks or bumps. Data retrieval in read-only optical data storage media is facilitated by the difference in diffractive properties.

Write-once optical data storage media commonly take the form of a polycarbonate substrate spin coated with a layer of organic dye. Data is recorded by illuminating the organic dye layer through the substrate with a light beam whose intensity is modulated in accordance with data to be recorded. Select areas of the organic dye subjected to high intensity light chemically change and result in "dark" areas, i.e., areas which have a lower light reflectivity when compared to areas of the organic dye which are not subjected to high intensity light. To achieve compatibility with read-only optical data storage media, data is recorded as a sequence of low reflectivity dark regions each one of which is positioned between spaces of high reflectivity. This difference in reflectivity facilitates data retrieval. The chemical change in the organic dye is irreversible. Thus, data written to the organic dye layer cannot be overwritten.

Utility of the disk can be increased by including both read-only and write-once portions on one or both sides of the disk. However, in order to manufacture such a disk, the organic spin-coated dye is patterned over the disk with separate areas for the read-only portions and write-once portions. This increases the complexity, and thereby the cost, in making the disk. The problem in partially coating a surface is that of shielding over the active surface. The effective shielding of the surface requires that an inner or outer annulus be covered without causing a shadowing effect (e.g., in sputter coated disks) or without dye streaking during spin coating, as in the case of dye based disks. Further, this must be accomplished with a variable degree of coverage from disk content to disk content. In practice, this is very difficult to achieve without affecting process yield and associated scrap cost.

Accordingly, an optical disk is desired that overcomes the disadvantages discussed above with conventional optical disks.

SUMMARY OF THE INVENTION

In accordance with one aspect of the invention, an optical disk has a multi-layer tuned optical coating overlying both small bumps to store pre-recorded information and lands onto which information is written-to and subsequently read from. The optical coating includes a phase-change metal/alloy layer formed over the disk substrate and a dielectric layer formed over the phase-change layer. An optical disk according to the invention has specific topological features and sizes.

According to one embodiment, a substrate has oppositely facing first and second surfaces. At least the first surface has a pattern of bumps and surrounding planar regions representing a read-only portion and a spiral pattern of lands and grooves representing the writeable portion. A first metal/alloy layer is formed overlaying the first surface of the substrate. The first metal/alloy layer is formed from tin, antimony and an element selected from the group consisting of indium, germanium, aluminum, and zinc. After the first metal/alloy layer is formed, a first dielectric layer is formed overlaying the first metal/alloy layer. This dielectric layer is formed from silicon oxynitride, although other dielectrics are also suitable. The first metal/alloy layer is positioned between the substrate and the first dielectric layer. These two layers form a continuous optical coating overlying both the read-only and writeable portions. The thickness and optical constants of the coating can be adjusted for specific wavelengths.

In this embodiment, there is a significant advantage in the use of the silicon oxynitride layer, which is made, for example, by the sputtering of silicon through a gas mixture of oxygen and nitrogen. The silicon oxynitride layer can be adjusted and controlled in its optical index by varying the ratios of oxygen and nitrogen. This fine tuning of the optical index allows a high degree of tune-ability to achieve a precise optical tuning. Parameters that can be controlled and varied are the intrinsic index control through oxygen and nitrogen mixture control and thickness control. Optical tuning of the dielectric layer can result in a suitable degree of surface reflectance for tracking and focusing, while maintaining a sufficient degree of laser absorption for writeability.

Further, with the present invention, the coating is a single continuous layer structure that does not require any shielding on the disk and is applied over the whole surface at once. The coating is continuous and does not vary depending on the degree of the disk that is pre-recorded or write-able.

In one embodiment, the optical disk has a spiral pattern of bumps and/or a spiral land, where the outer diameter of the disk is no larger than 50 mm, and is typically 32 mm or less, and the thickness is typically 0.6 mm. The lands are formed such that the sidewalls of the lands are not perpendicular to the bottom of the disk. To maximize push-pull signal efficiency and yet achieve suitable manufacturing process yield, the angle is between approximately 40° and 50°, with a typical angle of 45°, and a variation of ±15°. Above this range, the disk is difficult to extract from the mold, affecting process yield. Below this angle, the signal strength is compromised. The height of the land is 85 nm±5 nm, while the track pitch, i.e., the radial distance between centerlines of adjacent lands, is 0.74 µm±0.03 µm. The width of the land, measured at full-width half-max on a molded disk, is 400 nm±50 nm or approximately 55% of the track pitch. The lands are formed having a sinusoidal wobble, with the wobble frequency and amplitude, in one embodiment, at 128.2051 kHz and 55±15 nm (or 7.5%±2% of the track pitch), respectively. High frequency wobble marks (HFWMs) are formed in the wobble, where the amplitude of the HFWMs is approximately equal to the amplitude of the wobble to within ±25% and the frequency of the HFWMs is between 384.6153 and 641.0256 kHz, corresponding to 3 to 5 times the frequency of the wobble.

The bumps, which are formed during manufacture and store the mastered information, have a width (measured at full-width half-max on the molded disk) of 225±20 nm or 30%±3% of the track pitch. The track pitch between centerlines of adjacent bumps, in one embodiment, is 0.74 µm±0.03 µm. As with the lands, the bumps are formed with angled sidewalls, with the angle between 40° and 50° and a typical angle of 45°. The height of the bumps is 85±5 nm, and the lengths of the bumps vary in integer lengths of 179 nm.

The present invention will be more fully understood when taken in light of the following detailed description taken together with the accompanying drawings.

BRIEF DESCRIPTION OF THE DRAWINGS

Use of the same or similar reference numbers in different figures indicates same or like elements.

DESCRIPTION OF THE PREFERRED EMBODIMENTS

In accordance with one aspect of the present invention, an optical storage disk is formed from a substrate having small molded bumps for storing pre-recorded or mastered information and spiral lands for writing information to and reading information from. A phase-change metal/alloy layer is deposited on the top of the bumps and lands, followed by deposition of a dielectric layer over the phase-change layer. This resulting optical coating covers substantially the entire surface of the disk and can be "tuned" to specific optical wavelength ranges. The "tuning" is achieved by varying the thicknesses and optical indices of the phase-change and dielectric layers. A disk with these small molded bumps has specific properties associated with it, such as a size no larger than approximately 50 mm in outer diameter. Disks according to the invention have a distinct topology, which include differing density writeable and pre-recorded (or ROM) portions and high and low frequency wobbles, along with specific ranges associated with these features.

Figure 1:
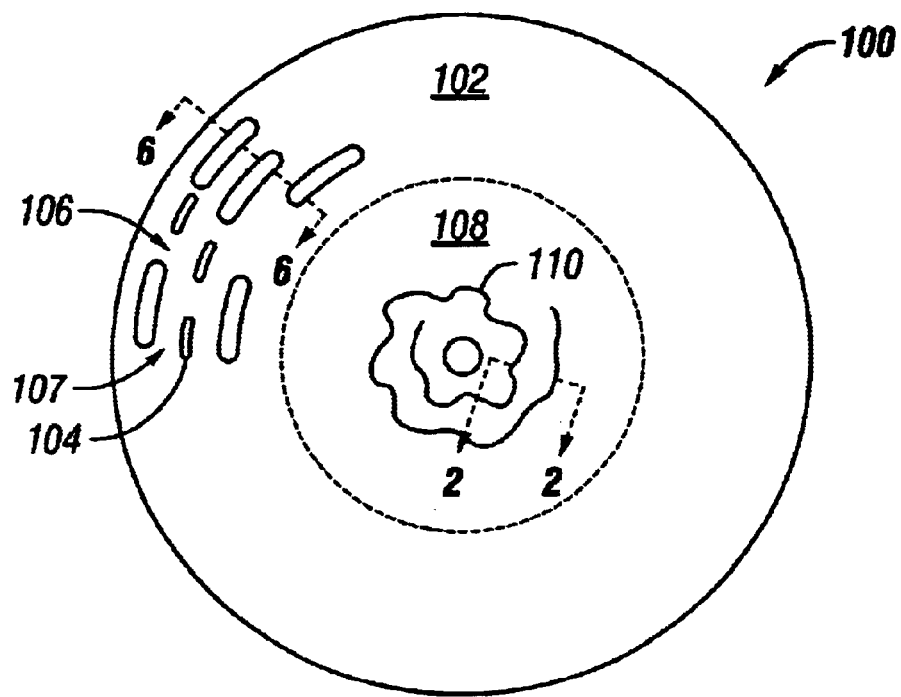
FIG. 1 is a top view of a first surface optical disk according to one embodiment of the present invention.

FIG. 1 is a top view of a first surface optical disk 100 according to one embodiment of the present invention. Disk 100 has a first or mastered (ROM) portion 102 that contains pre-recorded or mastered information in the form of bumps 104, planar regions 106 between bumps 104 along the same spiral, and planar regions 107 between bumps 104 across spiral tracks and a second or writeable portion 108 having lands 110 that can be written to by the user. Note that lands and bumps are protrusions in the disk on the side of the optical read and write head. Lands 110 have wobbles and micro-fluctuations that allow optical heads to track along the wobbled lands for accurate reading. Mastered or ROM portion 102 has a lower density or storage capacity than writeable portion 108, as will be discussed in detail below. It should be noted that although FIG. 1 shows specific portions corresponding to both bumps (ROM portion) and lands (writeable portion), optical disks according to the invention can have all mastered portions on a side, all writeable portions on a side, or a combination of both, with ROM portions 102 and writeable portions 108 located anywhere and in multiple areas on the disk surface. Such disks are described in commonly-owned U.S. patent application Ser. No. 09/764,042, entitled "First-Side Dual-Layer Optical Data Storage Disk and Method of Manufacturing the Same", filed Jan. 16, 2001, Ser. No. 09/560,781, entitled "Miniature Optical Disk for Data Storage", filed Apr. 28, 2000, and Ser. No. 10/085,682, entitled "A Dual Density Disc With Associated Properties" (M-12013 US), all of which are incorporated by reference in their entirety.

ROM portion 102 contains a sequence of bumps 104 that are read to reproduce the stored information. Bumps 104 are formed during the manufacture of the disk. Writeable portion 108 contains spiral lands 110, where the lands are the portions of the disk closest to the optical reader or head. Lands 110 are written to and read from for storing and reproducing the information, respectively, and the wobbled lands are used for tracking. Features (e.g., the wobbled lands) that are used for tracking must be the same as the ones cut by the original mastering beam. Thus, this requires the disk to be made from mother stampers as described below. Details of using a mother stamper for manufacturing a disk are disclosed in commonly-owned U.S. patent application Ser. No. 10/056,927, entitled "Use of Mother Stamper for Optical Disk Molding", filed Jan. 24, 2002, which is incorporated by reference in its entirety.

Mother stampers have recesses and grooves that correspond to the original laser cut. Resin or polycarbonate flows into these recesses and grooves, such as through injection molding, to form the bumps and lands of the optical disk. It is more difficult for resin to flow completely into small recesses (to form the small bumps) than to flow over small protrusions (to form small pits) when forming disks using father stampers. Consequently, the small size of the bumps (discussed in more detail below) limits the size of the optical disk formed using a mother stamper to approximately 50 mm or less, and more preferably to 32 mm or less.

This size limitation is attributable to a variety of factors, one being the ability for hot resin to completely fill the small recesses of the mother stamper. This requires the resin to completely displace the air in the recesses, which requires that the viscosity of the resin be as low as possible. Because during injection molding, resin flows from the center toward the outer edge of the disk, the ability to fill recesses along the outer perimeter is usually the limiting condition. Hence the smaller the diameter of the disc, the easier it is to achieve the optimal degree of filling of the recesses that will become the molded bumps.

There are three possible ways to minimize the resin viscosity. One way is to use a low molecular weight material; however, low molecular weight can compromise the physical integrity of the disk and can also lower the maximum use temperature of the resulting disk. Another way is to heat the resin to a very high temperature; however, injection molding processes typically already use maximum temperatures in order to get short molding cycles, so any further increase would result in charring and resin degradation. The third way is to minimize the cooling of the resin as it flows through the recesses. This can be accomplished by limiting the distance the resin has to travel outward during the molding process. It has been determined that with current injection molding processes, the maximum distance is an optical disk having an outer diameter of approximately 50 mm. Better results in terms of process yield and recess-fill are found at lower diameters such as 32 mm. Diameters smaller than 32 mm result in disks having too small a storage capacity for practical use.

Minimizing the amount of resin injected (the "shot" size referring to the amount of resin used per shot in the mold) maximizes the speed of injection, which also contributes to minimizing resin viscosity. This is because the leading edges of larger resin shots tend to have a harder time flowing into areas of the mold due to greater cooling and lower velocity. The less the time to inject the resin the shorter time it resides in the injection port and the less cooling occurs in that process. It has been found that a shot size of 0.5 g to 0.8 g of polycarbonate is suitable, resulting in a disk thickness of approximately 0.6 mm or less, with a typical thickness of 0.6 mm±0.03 mm. Lower amounts would result in disks that would be too thin for stability, while higher amounts would result in shot sizes that are difficult to maintain at desired temperatures. Higher amounts will also either result in a thicker disk (undesirable from a product perspective) or require that the outer diameter of the disc be enlarged, which exacerbates the flow problem explained above.

Figure 2:
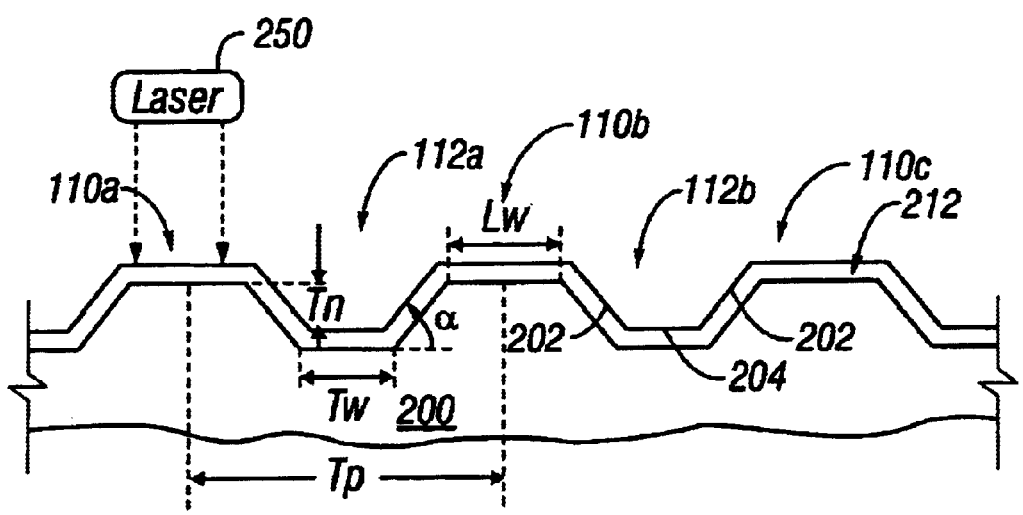
FIG. 2 is a side view of the optical disk of FIG. 1 along sectional line 2—2.

FIG. 2 is a side view of optical disk 100 along a sectional line 2—2 of FIG. 1 containing writable portion 108. Writable portion 108 includes lands 110 and grooves 112 formed on a substrate 200, such as a polycarbonate substrate by injection molding. The data surface of substrate 200 contains the lands and grooves. Because this is a first-surface disk, light from a laser 250 used to read and write data impinges first on the data surface of substrate 200. An optical coating layer 212 is formed over the substrate 200. Optical coating layer 212 includes a phase-change metal/alloy layer and an overlying dielectric layer. Note that optical coating 212 layer is a substantially continuous coating that covers both ROM portion 102 and writeable portion 108, e.g., layer 212 is deposited in the same way and at the same time over both ROM portion 102 and writeable portion 108. The thicknesses of the phase-change layer and dielectric layer can be varied depending on the desired wavelength of the read and write laser. Details for depositing the phase-change layer and dielectric layers, as well as suitable materials and properties of each, are described in U.S. patent application Ser. Nos. 09/764,042 and 09/854,333.

According to the present invention, data is written on lands 110 instead of in grooves 112 in a first surface disk. The first surface disk is a disk in which the read or write laser impinges on and reflects off the first surface (e.g., optical coating layer 212) instead of first travelling through a substrate before hitting the information or data layer. When writing on the lands, as compared with writing on the grooves, the optical phase shift results in an effectively shallower groove. This yields a higher contrast between the written-to and unwritten portions. Consequently, the optical system receives higher reflected signal amplitudes, thereby improving system performance. Additional details of the effects of the grating structure and phase-change material are disclosed in commonly-owned U.S. patent application Ser. No. 10/056,927, entitled "Use of Mother Stamper for Optical Disc Molding", filed Jan. 24, 2002, and Ser. No. 10/085,682, entitled "A Dual Density Disc With Associated Properties", filed Feb. 26, 2002, incorporated by reference in their entirety. It should be noted that although the description refers to a single data layer on a side of the optical disk, two data layers on a side are also suitable, such as disclosed in commonly-owned U.S. patent application Ser. No. 09/764,042.

In some embodiments, using a SbInSn alloy as the phase-change material and a silicon oxynitride as the dielectric layer, the thicknesses range from about 80 nm to about 90 nm, with a typical thickness of 85 nm±3% and about 54 to about 58 nm, with a typical thickness of 56 nm±3%, respectively.

Writeable portion 108 includes a plurality of alternating lands 110a–c and grooves 112a–b, which are shown as having the same width, although their widths could be different. Grooves 112a–b are in the form of a trough, with inclined left and right sidewalls 202 and flat bottoms 204 and can be arranged in a spiral pattern or another desired pattern. The left and right sidewalls 202 are typically inclined at an angle α (alpha) ranging from about 30° to about 50°, with a typical angle of about 45°. The angle is measured relative to the bottom of groove 112 of an uncoated disk and along the groove wall between $0.1T_h$ and $0.9T_h$, where $T_h$ is the height of the groove. The range should be ±15° from the 45° nominal.

Figure 3:
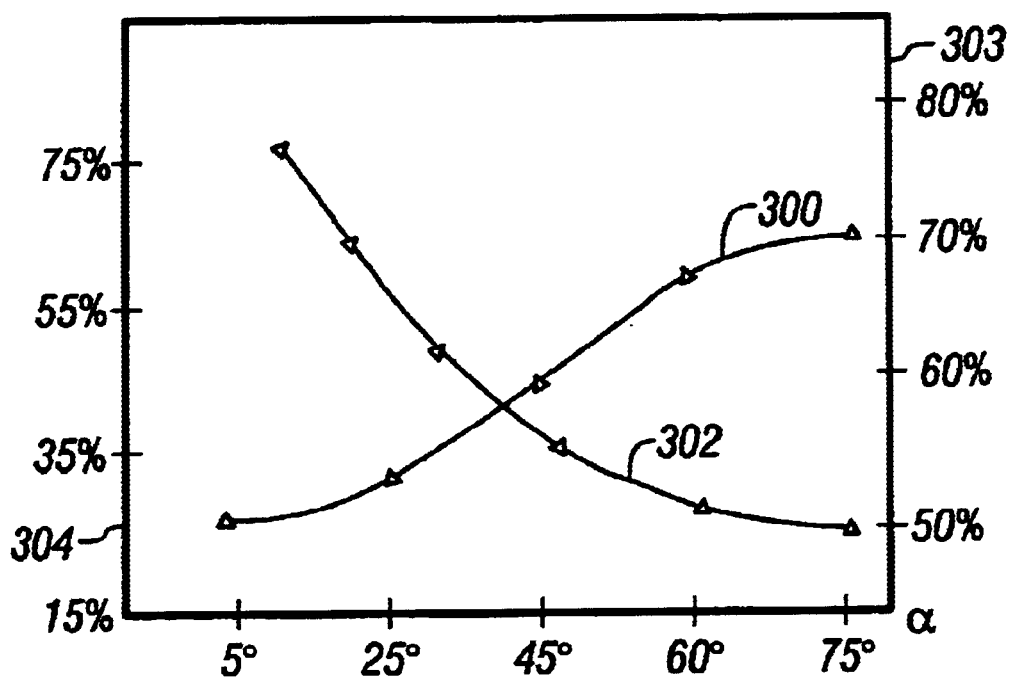
FIG. 3 is a plot showing the relationship of the angle of the sidewalls of the lands to the push-pull signal efficiency and the process yield.

FIG. 3 is a plot showing the relationship of angle α to the push-pull signal efficiency and the process yield. The push-pull signal is defined here as a measure of the electrical signal that is detected by the components of the split detector in the optical head that contribute to the tracking error signal. When expressed as a percentage, the push-pull signal is the differential intensity given as a percentage of the sum of the detector intensities. As in optical diffraction efficiency, the push-pull efficiency is the relative efficiency of the returned diffracted signal as a percentage of the total returned intensity. The exact mathematical derivation can be found in G. Bouwhuis et al., "Principles of Optical Disc Systems", Adam Hilger, Bristol 1985, Chapter 2.

As seen from FIG. 3, there is a tradeoff between process yield and push-pull signal efficiency. The push-pull signal efficiency is shown as line 300 and the associated ordinate 303, and the process yield is shown as line 302 and the associated ordinate 304. For the present invention, a wall angle α of approximately 45° provides a desirable mix of process yield and push-pull signal efficiency. It should be noted that if a design required a higher process yield or a higher push-pull signal efficiency, a different angle can be chosen, with a corresponding decrease in the performance of the other characteristic.

Referring back to FIG. 2, the height $T_h$ of sidewalls 202 (i.e., distance from the top of the land to the bottom of the groove) ranges from about 80 nm to about 90 nm, with a typical height of 85 nm, without coating. The physical pitch or distance $T_p$ of the adjacent center lines (where data is written to or recorded) of lands 110a and 110b typically is about 0.74 µm±0.03 µm and can be in the range from about 0.70 to about 0.78 µm, where the physical track pitch is the average distance between adjacent physical land centerlines, measured in the radial direction.

The width $L_w$ of lands 110 and the width $T_w$ of the bottoms of grooves 112 are typically approximately the same, and the inclined left and right sidewalls 202 are approximately the same length. For an uncoated disk, $L_w$ is 400 nm±50 nm in one embodiment or approximately 55% of the track pitch $T_p$, measured at full-width half-max. As will be appreciated, however, $L_w$ (width of lands 110) and $T_w$ (width of the bottoms of grooves 112) can be different depending on the application. However, in part, because writeable portion 108 does not require small cavities to be filled during manufacture, the data density can be higher than in ROM portion 102. This dual density allows process yields to be maximized when manufacturing optical disks according to the present invention.

Figure 4:
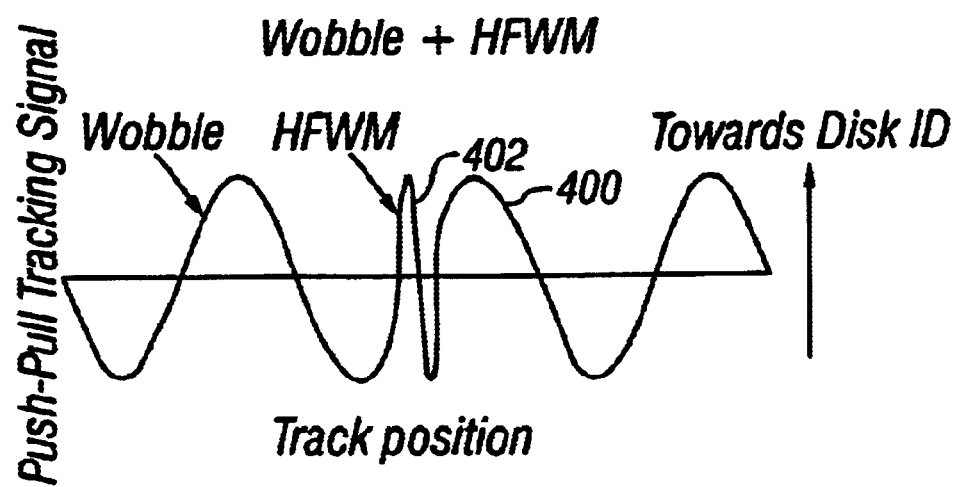
FIG. 4 shows a portion of the wobble and HFWMs according to one embodiment of the invention.

Writeable portion 108 of the disk contains tracks intended for a continuous servo tracking method. A physical track consists of a groove-land-groove combination, where each groove is shared with a neighboring physical track. The land is a continuous wobbled spiral over the entire writeable portion of the disk. Wobbles are known, such as described in U.S. Pat. No. 4,791,627, which is incorporated by reference in its entirety. Address information is embedded in the wobbled land as High Frequency Wobble Marks (HFWMs), which are a single cycle of wobble at a higher frequency (typically 3 to 5 times higher) than the primary wobble. FIG. 4 shows a portion of a wobble 400 with a HFWM 402. HFWMs in the wobble of the land on an optical disk are used to store physical address information. The presence of a HFWM at a negative zero crossing (i.e., on the negative slope region of the waveform) of the wobble indicates an active bit while the absence of a HFWM at a negative zero crossing of the wobble indicates an inactive bit. Alternatively, the presence of a HFWM at a positive zero crossing of the wobble indicates an active bit while the absence of a HFWM at a positive zero crossing of the wobble indicates an inactive bit. The zero crossing of the HFWM is located within ±10 degrees of the position where the wobble mark zero crossing would have been in the absence of the HFWM. The stored bits include information such as a synchronization mark used for timing, physical sector information including a physical sector address, and an error correction code for correcting misread of the physical sector information.

In one embodiment, shown in FIG. 4, HFWMs have a sinusoidal shape with an amplitude approximately equal to the amplitude of the wobble, e.g., within ±25% of each other. The amplitude is, for example, 55 nm±15 nm (or 7.5%±2% of the track pitch) from peak-to-peak in the plane of the disk, where the amplitude is measured on the push-pull tracking signal while track following. Also, as shown, the HFWM is inserted or positioned on the slope of the wobble that is moving toward the inner portion of the disk. Each sector of the optical disk includes, for example, 248 wobble cycles. Thus, for one sector, up to 248 HFWM bits may be inserted into the wobble cycles. The wobble frequency in the writeable portion is 128.2051 kHz (or 20 MHz code clock/156) with a scanning velocity of 2.9 m/sec, which corresponds to a HFWM frequency of 384.6153 kHz to 641.0256 kHz. The 156 is a suitable divisor that places the wobble frequency in a range suitable for the mastering bench laser modulators and yet is an integer multiple of both the RLL code clock frequency and the ECC block size.

The average value of the peak-to-peak signal amplitudes measured across 5 consecutive tracks for both the wobble and HFWM, over both written and unwritten areas of the disk satisfies the following:

$$0.05 < Amp_{peak-to-peak}/I_{land} < 0.10$$

Figure 5:
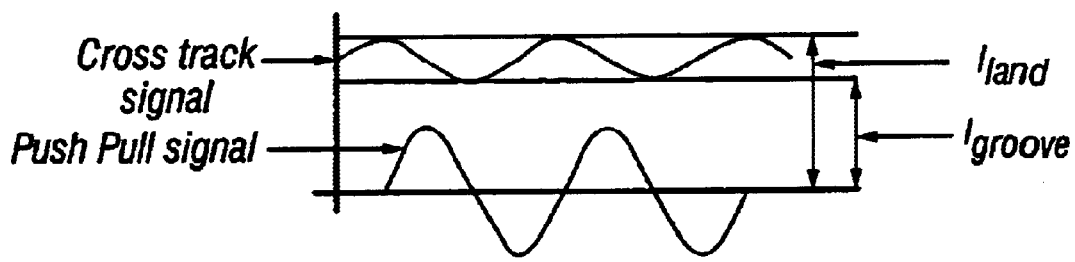
FIG. 5 shows $I_{land}$ and $I_{groove}$ in relation to the cross track and push-pull signal.

$I_{land}$ is shown in FIG. 5, and is defined as the integrated sum signal (integrated over all the detector quadrants) derived from the land regions of the grooved disc. As noted above, the peak-to-peak amplitudes of the wobbles and HFWMs are within 25% of each other.

The wobble CNR is defined as the wobble signal carrier amplitude relative to the noise floor amplitude as measured on a spectrum analyzer. When measuring the wobble CNR, the spectrum analyzer resolution bandwidth is set to 1 kHz, and the spectrum analyzer center frequency is set to 128.2051 kHz. The wobble CNR is typically greater than 23 dB.

Figure 6:
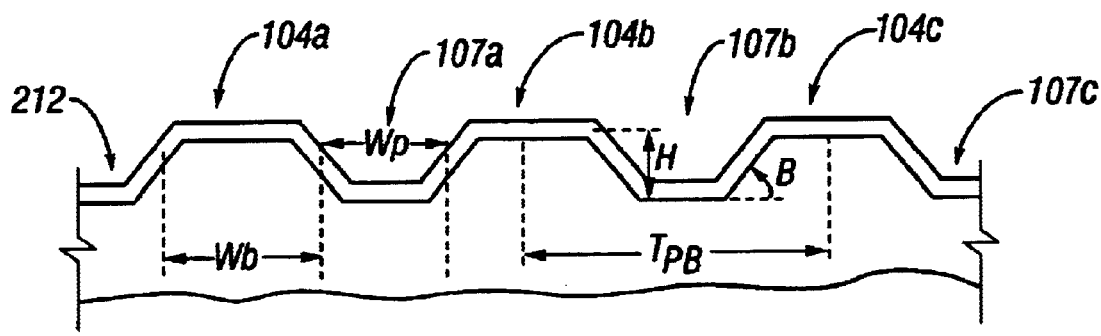
FIG. 6 is a side view of the optical disk of FIG. 1 along sectional line 6—6.

FIG. 6 is a side view of optical disk 100 along a sectional line 6—6 of FIG. 1 containing ROM portion 102. The mastered or pre-recorded information is represented as a series of bumps 104 and planar regions 107 between radially adjacent bumps 104. FIG. 5 shows three adjacent bumps 104a, 104b, and 104c, and three radially adjacent planar regions 107a, 107b, and 107c. The series of bumps 104 and planar regions 107 are typically configured in a spiral pattern on the disk surface. Uncoated width $W_b$ of bumps 104 ranges from 200 to 250 nm, with a typical width of 225 nm±5 nm, measured at full width half max. In relative terms, width $W_b$ of bumps 104 is typically 30%±3% of the track pitch. In one embodiment, when a bump is present in an adjacent track, uncoated widths $W_p$ of planar regions 107 range from 485 to 545 nm, with a typical width of 515 nm, measured at full width half max. The track pitch $T_{PB}$ is the average distance between the centerlines of adjacent bumps and, in one embodiment, is 0.74±0.03 µm. The height H of each uncoated bump 104 ranges from about 80 nm to about 90 nm, with a typical height of 85 nm. Bumps 104 are formed at a wall angle β from the planar region of the optical disk. As with the wall angle for the lands, wall angle β is between 40° and 50° with a deviation of ±15° from the nominal, measured along the wall of the bump between 0.1H and 0.9H. After coating (with phase-change material and protective coating), the ranges for the width of the bumps are between approximately 340 and 360 nm. Note that the molded disc in ROM portion 102 is also coated with optical coating layer 212, which in this portion, only acts as a reflector and is not written to.

Figure 7:
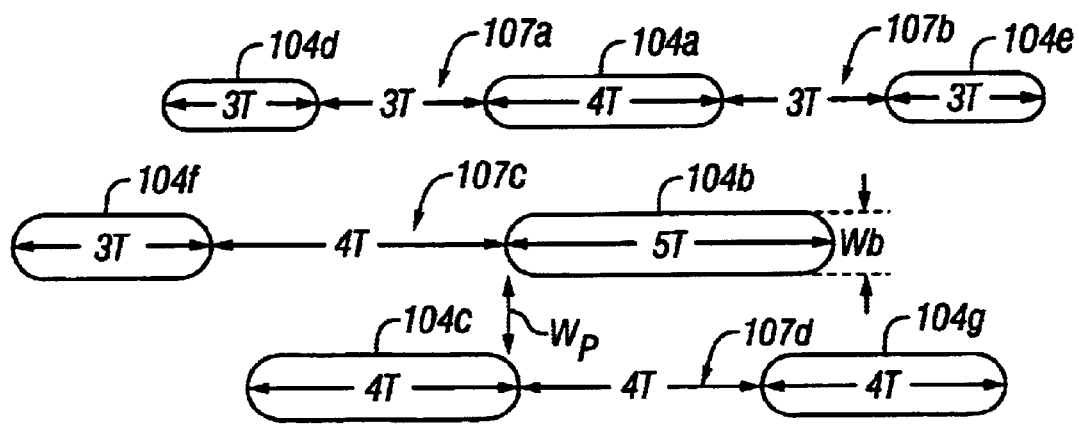
FIG. 7 is a top view along a ROM portion of the optical disk of FIG. 1.

FIG. 7 is a top view of optical disk 100 along an ROM portion 102. A sequence of bumps 104a–g area planar regions 107a–d are shown, where an optical reader scans or reads the bumps and planar regions along the longitudinal direction. The lengths of bumps 104 have various coated and uncoated lengths, which are shown in Table 1 below. Planar regions 107 are generally the same length as bumps 104. The mark, T, represents a minimum timing mark, with mark lengths corresponding to pulse intervals ranging from 3T to 14T.

TABLE 1

| Mark (T) | Typical bump length after coating (nm) | Molded bump length (uncoated) (nm) |
|---|---|---|
| 3 | 537 | 387 |
| 4 | 716 | 566 |
| 5 | 895 | 745 |
| 6 | 1074 | 924 |
| 7 | 1253 | 1103 |
| 8 | 1432 | 1282 |
| 9 | 1611 | 1461 |
| 10 | 1790 | 1640 |
| 11 | 1969 | 1819 |
| 14 | 2506 | 2356 |

Usually, each bump and each planar region represents a number of binary bits. Bumps 104 and planar regions 107 can be formed when the optical disc is formed using a mother stamper, as disclosed in U.S. Pat. Application M-11628 US, referenced above.

To summarize, disk 100 contains two basic areas, ROM portion 102 and writeable portion 108. The ROM portions contain a spiral track of bumps that are embossed onto the disk during manufacture, the pits or bumps being separated by spaces; immediately following manufacture, the writeable portion contains only spiral grooves and lands, which is also embossed onto the disk. The ROM portions do not need to contain a groove because the track of embossed bumps can be used by the optical head for tracking purposes. In the writeable portions, the spiral lands between the turns of the groove provide a tracking signal during the reading or writing of information. In the embodiment described, the digital information in the writeable portion consists of crystalline "bits" in the otherwise amorphous active layer. The crystalline bits, which are analogous to the bumps in the ROM portions, are formed on the lands.

The specific topological features of the optical disk provide numerous advantages in the writeable portions. The data-to-clock jitter is in the range of less than 9%. The carrier-to-noise ratios are over 50 dB using read power levels of less than 250 micro-watts and write power levels of less than 2 mW at the disk surface. Adjacent track cross talk levels are less than −25 dB.

The cross track signal is the sum signal measured when the focused beam crosses tracks. In one embodiment, the cross track signal over both unwritten and written areas of the disk satisfies the following:

$$0.05 < (I_{land} - I_{groove})/I_{land} < 0.20$$

Referring back to FIG. 5, $I_{land}$ is the sum signal derived from the land portions, and $I_{groove}$ is the integrated sum signal derived from the groove portions of the disk.

The push-pull tracking signal over the written areas of the disk satisfies the following:

$$0.29 < \text{Push-Pull Signal}_{peak-to-peak}/I_{land} < 0.39,$$

while the push-pull tracking signal over the unwritten areas of the disk satisfies the following:

$$0.24 < \text{Push-Pull Signal}_{peak-to-peak}/I_{land} < 0.34$$

The ratio of the peak-to-peak push-pull signal over a written area $PP_W$ to an unwritten area $PP_U$ satisfies the following:

$$0.65 < PP_W/PP_U < 0.90$$

The divided push-pull signal is defined as the minimum peak-to-peak push-pull signal amplitude divided by the maximum peak-to-peak push-pull signal amplitude measured over the entire writable portion of the disk surface. The divided push-pull is typically greater than 0.60.

In addition, the defined topology permits the following characteristics, according to one embodiment, to be achieved in the ROM or pre-recorded portion of the disk. The cross track signal is filtered by a $2^{nd}$ order low pass filter with a cutoff frequency of 100 kHz for measurements over ROM data. The filtered cross track signal satisfies the following:

$$0.05 < (I_{space} - I_{bump})/I_{space} < 0.20$$

Figure 8:
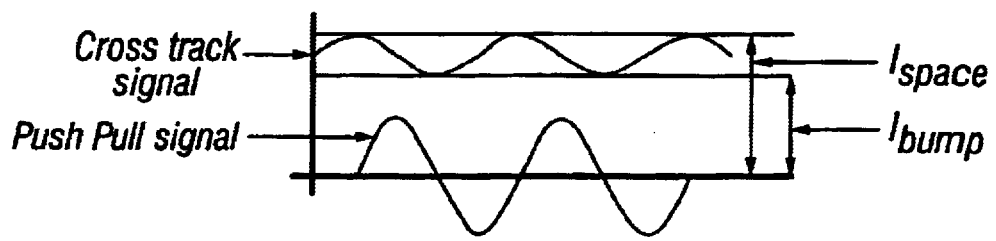
FIG. 8 shows $I_{space}$ and $I_{bump}$ in relation to the cross track and push-pull signal.

$I_{space}$ and $I_{bump}$ are shown in FIG. 8, and defined as the integrated sum signal from the detector quadrants as derived from the area of the disk surface that is the space between the bump features and the bump features themselves.

The push-pull tracking signal is also filtered by a $2^{nd}$ order low pass filter with a cutoff frequency of 100 kHz for measurements over ROM data. The filtered push-pull tracking signal satisfies the following:

$$0.11 < \text{push-pull signal}_{peak-to-peak}/I_{land} < 0.20$$

Jitter is the standard deviation of the time variations of the binary read signal, which is either a positive or negative signal obtained from the data. The jitter of the leading and trailing edges is measured relative to the PLL clock and normalized by the channel bit clock period (50 nsec for 20 MHz RLL clock). The measured jitter is typically less than 9%.

Figure 9:
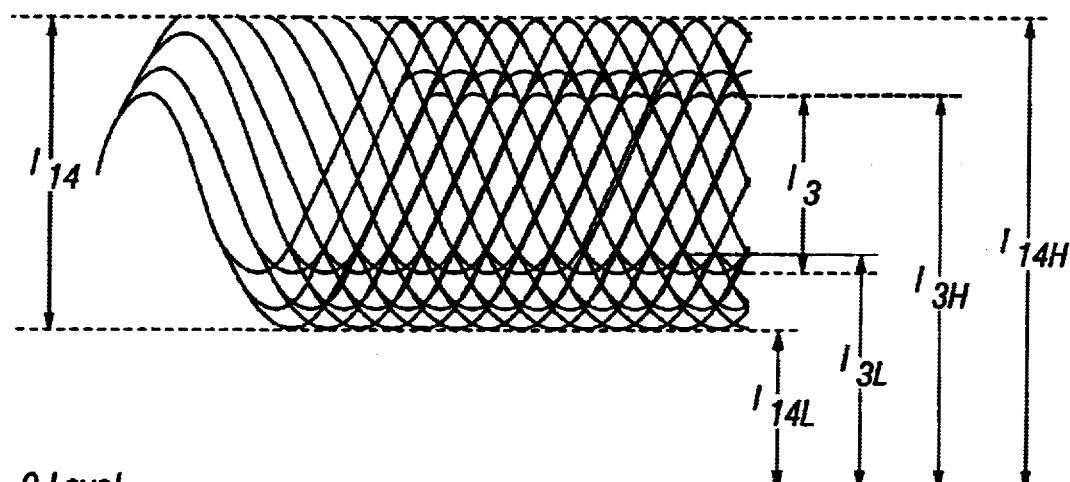
FIG. 9 shows the analog readback signal from random ROM data and various associated parameters according to one embodiment.

FIG. 9 shows the analog readback signal from random ROM data and identifies parameters that are used to further define the optical disk according to one embodiment. The ratio of the peak-to-peak amplitude of a 3T signal $I_3$ to the peak-to-peak amplitude of an 14T signal $I_{14}$ is greater than 30%, i.e., $I_3/I_{14} > 0.30$. The modulation depth is defined as the peak-to-peak amplitude of the 14T signal $I_{14}$ divided by the maximum amplitude of the 14T signal $I_{14H}$. The modulation depth satisfies the following:

$$0.33 < I_{14}/I_{14H} < 0.48$$

ROM data signal envelope modulation is defined as the variation in 14T peak-to-peak signal amplitude ($I_{14T\ MIN}/I_{14T\ MAX}$) around a track and over an entire disk surface and satisfies the following:

$$I_{14T\ MIN}/I_{14T\ MAX} > 0.85 \text{ around any single track}$$

and $$I_{14T\ MIN}/I_{14T\ MAX} > 0.70 \text{ over entire disk surface}$$

ROM data crosstalk is obtained by measuring the ROM data envelope while crossing tracks. The ROM data crosstalk is defined as the minimum peak-to-peak ROM data envelope amplitude divided by the maximum peak-to-peak ROM data envelope amplitude. The ROM data crosstalk satisfies the following:

$$\text{ROM}_{data\ envelope\ MIN}/\text{ROM}_{data\ envelope\ MAX} < 0.85$$

Asymmetry is defined as the average value of the 14T signal minus the average value of the 3T signal divided by the amplitude of the 14T signal, where the subscripts H and L indicate the maximum and minimum amplitudes, respectively. Asymmetry satisfies the following:

$$-0.05 < [(I_{14H} + I_{14L})/2 - (I_{3H} + I_{3L})/2]/I_{14} < 0.15$$

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A first surface optical disk, comprising:
  a substrate having a circular first surface and an opposing circular second surface, wherein the outer diameter of the first and second surface is approximately less than 50 mm;
  a spiral pattern of bumps on a first portion of the circular first surface, wherein information is stored on and read from the bumps;
  a second portion of the circular first surface defining a pattern of alternating lands and grooves, wherein each groove has inclined sidewalls, the inclined sidewalls for each groove being inclined approximately 45 degrees with respect to a bottom of the groove; and
  a continuous multi-layer optical coating overlaying the bumps and the lands and grooves on the circular first surface, wherein the optical coating comprises:
    a metal/alloy layer comprising tin, antimony and an element selected from the group consisting of indium, germanium, aluminum, and zinc; and
    a dielectric layer overlaying the metal/alloy layer, the dielectric layer being configured to optically couple the metal/alloy layer to a laser beam incident on the dielectric layer.

2. The disk of claim 1, wherein the outer diameter of the first and second surface is approximately 32 mm or less.

3. The disk of claim 1, wherein the thickness of the substrate is approximately 0.6 mm±0.03 mm.

4. The disk of claim 1, wherein the width of the bumps is between approximately 200 nm and 250 nm, the width measured at half-width full-max.

5. The disk of claim 1, wherein the width of the bumps is 30%±3% of the track pitch of the bumps, the track pitch being the distance between the centerlines of adjacent bumps along the radial direction.

6. The disk of claim 1, wherein the average distance between centerlines of adjacent bumps along the radial direction is 0.74 $\mu$m±0.03 $\mu$m.

7. The disk of claim 1, wherein the height of the bumps is between approximately 80 nm and 90 nm.

8. The disk of claim 1, wherein the distance between two of the bumps in a radially adjacent direction is between approximately 485 nm and 545 nm, measured at full width half max.

9. The disk of claim 1, wherein the length of the bumps, covered by the optical coating, are multiples of 179 nm, the shortest length being a third multiple and the longest length being a fourteenth multiple.

10. The disk of claim 1, wherein the height of each land is between approximately 80 nm and 90 nm.

11. The disk of claim 1, wherein the width of each land is approximately 400 nm±50 nm, the width measured at half-width full-max.

12. The disk of claim 1, wherein the width of each land is approximately 55% of the track pitch of the land, the track pitch being the distance between the centerlines of radially adjacent lands.

13. The disk of claim 1, wherein the track pitch is between approximately 0.70 $\mu$m to 0.78 $\mu$m.

14. The disk of claim 1 wherein the lands define wobbles, the disk further comprising high frequency wobble marks (HFWMs) along the wobbles.

15. The disk of claim 14, wherein the frequency of the HFWMs is approximately 3 to 5 times the frequency of the wobbles.

16. The disk of claim 14, wherein the frequency of the HFWMs is between approximately 384 kHz to 641 kHz.

17. The disk of claim 14, wherein the amplitude of the wobbles and HFWMs is within ±25% of each other.

18. The disk of claim 1, wherein the dielectric layer comprises silicon oxynitride.

* * * * *